(12) United States Patent
Nishisaka et al.

(10) Patent No.: US 8,592,720 B2
(45) Date of Patent: Nov. 26, 2013

(54) POLARITY SWITCHING METHOD IN CONSUMABLE ELECTRODE AC PULSE ARC WELDING

(75) Inventors: Futoshi Nishisaka, Osaka (JP);
Hiroyasu Mondori, Osaka (JP)

(73) Assignee: DAIHEN Corporation, Osaka (JP)

(*) Notice: Subject to any disclaimer, the term of this patent is extended or adjusted under 35 U.S.C. 154(b) by 0 days.

(21) Appl. No.: 11/714,901

(22) Filed: Mar. 6, 2007

(65) Prior Publication Data

US 2007/0246448 A1 Oct. 25, 2007

(30) Foreign Application Priority Data

Apr. 20, 2006 (JP) ................................ 2006-116930

(51) Int. Cl.
*B23K 9/10* (2006.01)
(52) U.S. Cl.
USPC ........................................................ 219/130.1
(58) Field of Classification Search
USPC ................................................ 219/130.1, 130.5
See application file for complete search history.

(56) References Cited

U.S. PATENT DOCUMENTS

| | | | | | |
|---|---|---|---|---|---|
| 4,553,018 | A | * | 11/1985 | Kondo et al. | 219/130.51 |
| 4,877,941 | A | * | 10/1989 | Honma et al. | 219/130.21 |
| 5,225,660 | A | * | 7/1993 | Mita et al. | 219/130.51 |
| 6,600,135 | B2 | * | 7/2003 | Tong | 219/137 PS |
| 6,833,529 | B2 | * | 12/2004 | Ueyama et al. | 219/130.21 |
| 7,102,099 | B2 | * | 9/2006 | Huismann et al. | 219/130.51 |
| 2004/0232129 | A1 | * | 11/2004 | Houston et al. | 219/130.51 |
| 2006/0213891 | A1 | * | 9/2006 | Stava | 219/130.21 |

FOREIGN PATENT DOCUMENTS

| | | | | | |
|---|---|---|---|---|---|
| JP | 57081959 | A | * | 5/1982 | ............... B23K 9/09 |
| JP | 58-38664 | | | 3/1983 | |
| JP | 2-290674 | | | 11/1990 | |
| JP | 06170542 | A | * | 6/1994 | ............... B23K 9/12 |
| JP | 2004-160496 | | | 6/2004 | |
| JP | 2005-349406 | | | 12/2005 | |
| JP | 2006-88180 | | | 4/2006 | |
| JP | 2006088180 | A | * | 4/2006 | |

OTHER PUBLICATIONS

European Search Report from the corresponding EP 07 25 1243, mailed Nov. 15, 2007.

* cited by examiner

*Primary Examiner* — Henry Yuen
*Assistant Examiner* — Ayub Maye
(74) *Attorney, Agent, or Firm* — Hamre, Schumann, Mueller & Larson, P.C.

(57) ABSTRACT

A polarity switching control method is provided for consumable electrode AC pulse arc welding. By the method, a peak current and a base current are applied during an electrode-positive polarity period, while an electrode-negative current is applied during an electrode-negative polarity period. For performing the welding, polarity switching is performed to alternate the electrode-positive polarity period and the electrode-negative polarity period. When a consumable electrode and a base metal are in short circuit with each other, the polarity switching is performed after the short circuit is broken and an arc is generated.

2 Claims, 5 Drawing Sheets

POLARITY SWITCHING METHOD IN CONSUMABLE ELECTRODE AC PULSE ARC WELDING

BACKGROUND OF THE INVENTION

1. Field of the Invention:

The present invention relates to a polarity switching control method for improving stability during polarity switching in consumable electrode AC pulse arc welding.

2. Description of the Related Art:

For consumable electrode AC pulse arc welding (referred to as "AC pulse arc welding" below), a welding wire is supplied at constant speed, and two periods, i.e. an electrode-positive polarity period Tep and an electrode-negative polarity period Ten, are caused to alternate with each other. During the electrode-positive polarity period Tep, peak current Ip and base current Ib are applied, whereas during the electrode-negative polarity period Ten, electrode-negative current In is applied. In order to achieve high quality welding, it is important in AC pulse arc welding that polarity switching is performed properly so that no arc interruption occurs. To this end, conventionally, a high voltage is applied between the welding wire and the base metal in switching the polarity, as described below.

FIG. 4 is a timing chart illustrating conventional AC pulse arc welding. Specifically, Graph 4(A) shows the waveform of a welding current Iw, Graph 4(B) the waveform of a welding voltage Vw, and Graph 4(C) the waveform of a polarity switching signal Cp. When the polarity switching signal Cp changes from High level to Low level, a switching operation from the electrode-positive polarity period Tep to the electrode-negative polarity period Ten is performed. When the signal changes from Low level to High level, a switching operation from the electrode-negative polarity period Ten to the electrode-positive polarity period Tep is performed. A more specific explanation is given below.

(1) Period from Time Point t1 to Time Point t2.

As shown in Graph 4(C), the polarity switching signal Cp assumes Low level at Time Point t1, whereupon the base current Ib of the electrode-positive polarity period Tep decreases, as shown in Graph 4(A), toward a predetermined polarity switching current value Ic. At Time Point t2, the welding current Iw becomes equal to the polarity switching current value Ic, whereupon a high voltage is applied, and as shown in Graph 4(B), the polarity is switched to the electrode-negative polarity period Ten.

(2) Period from Time Point t2 to Time Point t3.

This period is an electrode-negative polarity EN. As shown in Graph 4(A), a predetermined electrode-negative current In is supplied, and an electrode-negative voltage Vn, as shown in Graph 4(B), is applied.

(3) Period from Time Point t3 to Time Point t4.

At Time Point t3, as shown in Graph 4(C), the polarity switching signal Cp changes to assume High level, upon which the electrode-negative current In decreases toward the polarity switching current value Ic as shown in Graph 4(A). At Time Point t4, the welding current Iw becomes equal to the polarity switching current value Ic as shown in Graph 4(A), upon which a high voltage is applied and the polarity is switched to the electrode-positive polarity EP as shown in Graph 4(B).

(4) Period from Time Point t4 to Time Point t5.

This period is a peak period Tp, in which the electrode-positive polarity EP is adopted. As shown in Graph 4(A) a predetermined peak current IP is supplied, and a peak voltage Vp, as shown in Graph 4(B), is applied.

(5) Period from Time Point t5 through Time Point t8.

This period is a base period Tb determined by feed-back control. During this period, the electrode-positive polarity EP is adopted. As shown in Graph 4(A), a predetermined base current Ib is supplied, and a base voltage Vb, as shown in Graph 4(B), is applied.

(6) Period from Time Point t8 to Time Point t9.

In this period, the process goes back to the (1) operation described above.

(7) Period from Time Point t6 to Time Point t7.

This period is included in the above-mentioned base period Tb. When short-circuiting occurs between the welding wire and the base metal, the welding voltage Vw assumes a low short-circuit voltage value, as shown in Graph 4(B). At the same time, as shown in Graph 4(A), an increasing short-circuit current Is is applied to terminate the short-circuiting quickly and to generate the arc again. As a result, the arc recurs at Time Point t7. It should be noted that short-circuiting occurs not only in the base period Tb but also in the peak period Tp as well as in the electrode-negative polarity period Ten. For these occasions, the same operation of applying the short-circuit current Is is supplied.

As seen from FIG. 4, the period from Time Point t2 through Time Point t4 is an electrode-negative polarity period Ten, and the period from Time Point t4 through Time Point t9 is an electrode-positive polarity period Tep. As described, the welding current Iw is decreased to the polarity switching current value Ic at the time of polarity switching. This is a conventionally common practice for protecting a polarity switching device from a surge voltage to be generated by polarity switching operation. For more information, see JP-A-H58-38664 and JP-A-2005-349406, for example.

In the above conventional AC pulse arc welding, stable polarity switching is achieved by applying a high voltage at the time of polarity switching, thereby preventing arc interruption. However, if short-circuiting occurs during the polarity switching, there is a high likelihood for occurrence of prolonged short-circuiting and arc interruption. This problem is descried below with reference to FIG. 5.

FIG. 5 shows how waveforms change when short-circuiting occurs during polarity switching. The chart corresponds to FIG. 4 described above. In FIG. 5, processes from Time Point t1 through Time Point t6 are identical with these in FIG. 4 and so will not be described again. The process after Time Point t6 will be described.

When short-circuiting occurs at Time Point t6, the welding voltage Vw assumes a low short-circuit voltage value as shown in FIG. 5(B) whereas the welding current Iw assumes the short-circuit current Is, i.e. increases as shown in FIG. 5(A). At Time Point t7, the polarity switching signal Cp changes to assume Low level as shown in FIG. 5(C), the operation begins to shift to the electrode-negative polarity EN, and therefore, the welding current Iw (short-circuit current Is) decreases as shown in FIG. 5(A) toward the polarity switching current value Ic. However, as shown in FIG. 5(B), because of the short circuit situation, the decrease in the welding current Iw is substantially slower as shown in FIG. 5(A) than the decrease under an arcing situation. Since the welding current Iw is decreased in spite of the short-circuiting situation, the short-circuiting becomes less likely to be terminated during the period from Time Point t7 to Time Point t8.

At Time Point t8, the welding current Iw becomes equal to the polarity switching current value Ic as shown in FIG. 5(A), whereupon the operational condition switches to electrode-negative polarity EN. However, as shown in FIG. 5(B), the short-circuiting situation continues even after the polarity changes. Thus, as shown in FIG. 5(A), the short-circuit current Is which has a large current value continues to be drawn at electrode-negative polarity EN even after Time Point t8, until Time Point t9, where the wire tip is melted and the arc ceases.

When short-circuiting occurs during polarity switching, the decreasing of the welding current Iw causes the short-circuiting to persist, thereby making the arc unstable or even broken by melting. Behind such a phenomenon is a fact that the pulse arc welding is not a short-circuit transfer welding. In pulse arc welding, it is necessary to quickly terminate short-circuiting and regenerate the arc for stable arcing. In short-circuit transfer welding such as $CO_2$ welding or MAG welding, short-circuiting occurs periodically about 100 times per second, so polarity switching can be performed successfully during the short-circuiting period. In pulse arc welding, however, short-circuiting occurs irregularly. In light of this, the polarity switching is to be performed while the arc is being generated.

SUMMARY OF THE INVENTION

The present invention has been provided in the above-described situation. It is therefore an object of the present invention to provide a polarity switching control method in consumable electrode AC pulse arc welding, which is capable of making stable polarity switching even if short-circuiting occurs at the time of polarity switching.

According to the present invention, there is provided a polarity switching control method in consumable electrode AC pulse arc welding. The method comprises the steps of: applying a peak current and a base current during an electrode-positive polarity period; applying an electrode-negative current during an electrode-negative polarity period; and conducting polarity switching for the welding by alternating the electrode-positive polarity period and the electrode-negative polarity period. When a consumable electrode and a base metal are in short circuit with each other, the polarity switching is performed after the short circuit is broken and an arc is generated.

With the above arrangement, the polarity switching is not performed while short-circuiting is present, but performed after the short-circuiting comes to an end and the arc is generated. Accordingly, it is possible to perform stable polarity switching and prevent prolonged short-circuiting or arc interruption. In particular, the present invention is advantageous for a case where the welding voltage is set at a low value for the purpose of reducing the heat conduction to the base metal or increasing the welding speed.

Preferably, the polarity switching may be performed after a lapse of a predetermined delay period starting from the generation of the arc. In this manner, it is possible to prevent short-circuiting from occurring immediately after the recurrence of the arc.

Preferably, a welding current applied at the generation of the arc may be maintained during the delay period. Since the welding current applied at the generation of the arc is high current, it is possible to attain a great arc length.

DETAILED DESCRIPTION OF THE PREFERRED EMBODIMENTS

Preferred embodiments of the present invention will be described below with reference to the accompanying drawings.

Figure 2:
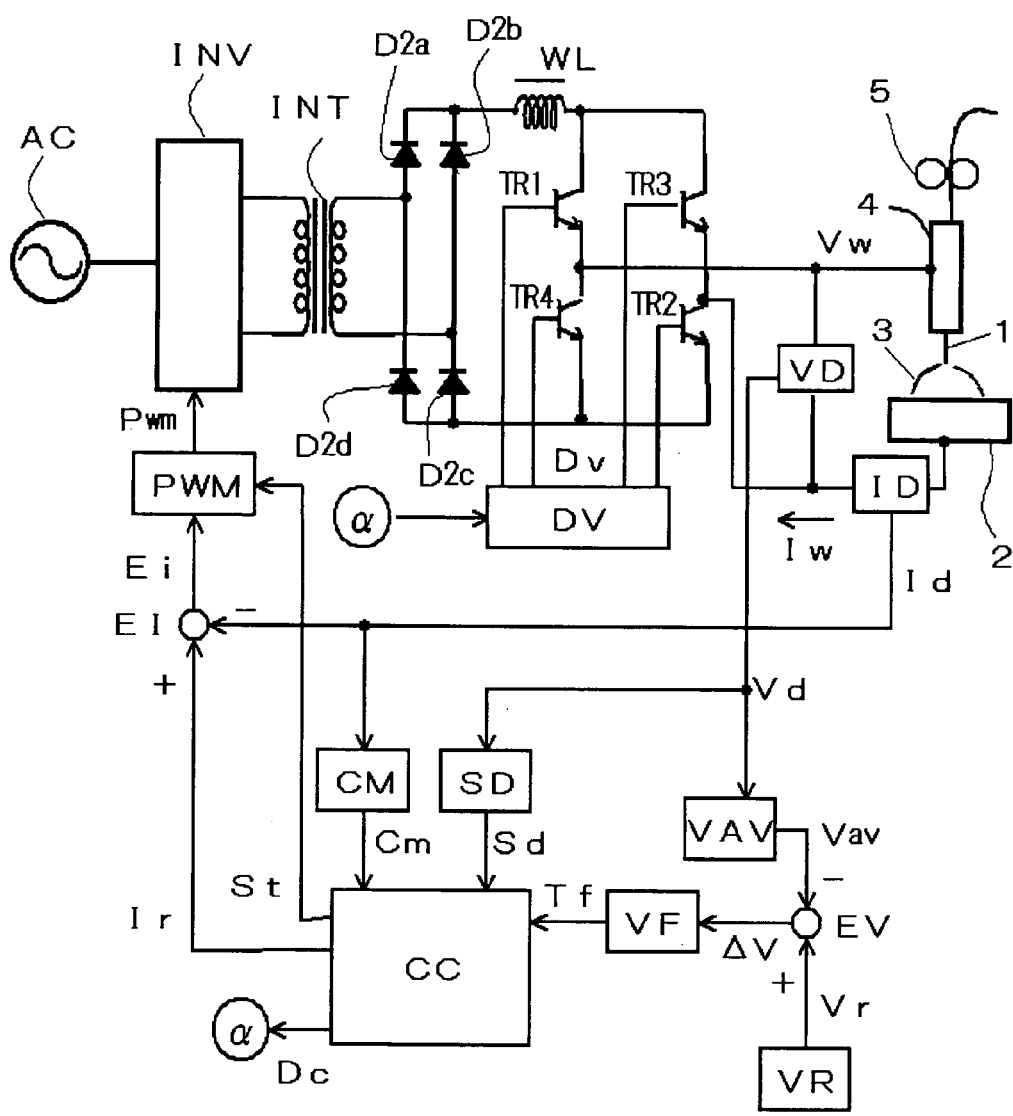
FIG. 2 is a block diagram of a welding power source used for implementing the method of the present invention.

FIG. 2 is a block diagram of a welding power source for implementing a polarity switching control method in consumable electrode AC pulse arc welding according to the present invention.

An inverter circuit INV receives commercially available AC power such as three-phase 200 volts as an input, and performs the rectification and smoothing of the input. In addition, the inverter circuit INV performs an inverter control in accordance with a pulse width modulation signal Pwm to be described later, and outputs high-frequency alternating current. A high-frequency transformer INT decreases the high-frequency AC to a voltage suitable to arc welding. Secondary rectifiers D2*a* through D2*d* rectify the reduced high-frequency AC. A reactor WL smoothes the rectified DC output. Transistors TR1 through TR4 constitute a secondary inverter circuit which outputs a welding voltage Vw and a welding current Iw in the electrode-positive polarity EP or in the electrode-negative polarity EN. The electrode-positive polarity EP is attained when the transistors TR1 and TR2 are turned on, while the electrode-negative polarity EN is attained when the transistors TR3 and TR4 are turned on. A welding wire 1 is fed by feed rollers 5 of a wire feeder, through a welding torch 4 so as to generate an arc 3 between itself and a base metal 2.

A voltage detection circuit VD detects the welding voltage Vw and outputs a voltage detection signal Vd. An average voltage calculation circuit VAV averages the voltage detection signals Vd, and outputs an average voltage signal Vav. A voltage setting circuit VR outputs a predetermined voltage setting signal-Vr. A voltage error amplification circuit EV amplifies an error between the voltage setting signal Vr and the average voltage signal Vav, and outputs a voltage error amplification signal ΔV. A V/F converter circuit VF outputs a pulse period signal Tf of a frequency proportional to the voltage error amplification signal ΔV. With this arrangement, the pulse period (base period) is subjected to a feedback control so that the average of the welding voltage Vw becomes equal to the value of voltage setting signal Vr.

A current detection circuit ID detects the welding current Iw, calculates the absolute value thereof, and outputs a current detection signal Id. A short-circuit determination circuit SD checks the value of the voltage detection signal Vd to see if there is a short circuit situation, and outputs a short-circuit identification signal Sd. An electric-current comparison circuit CM outputs an electric-current comparison signal Cm which assumes High level when the current detection signal Id is no greater than a predetermined polarity switching current value Ic. A main control circuit CC receives the pulse period signal Tf, the short-circuit identification signal Sd and the electric-current comparison signal Cm as inputs, performs an operation which will be described later with reference to FIG. 1, and then outputs an operation-stop signal St, an electric-current setting signal Ir and an operation control signal Dc.

An electric-current error amplification circuit EI amplifies an error between the electric-current setting signal Ir and the current detection signal Id, and outputs an electric-current error amplification signal Ei. A pulse width modulation circuit PWM performs pulse width modulation based on the electric-current error amplification signal Ei when there is no output of the operation-stop signal St (when the signal assumes Low level), and outputs a pulse width modulation signal Pwm. A drive circuit DV drives the transistors TR1 through TR4 based on the operation control signal Dc.

Figure 1:
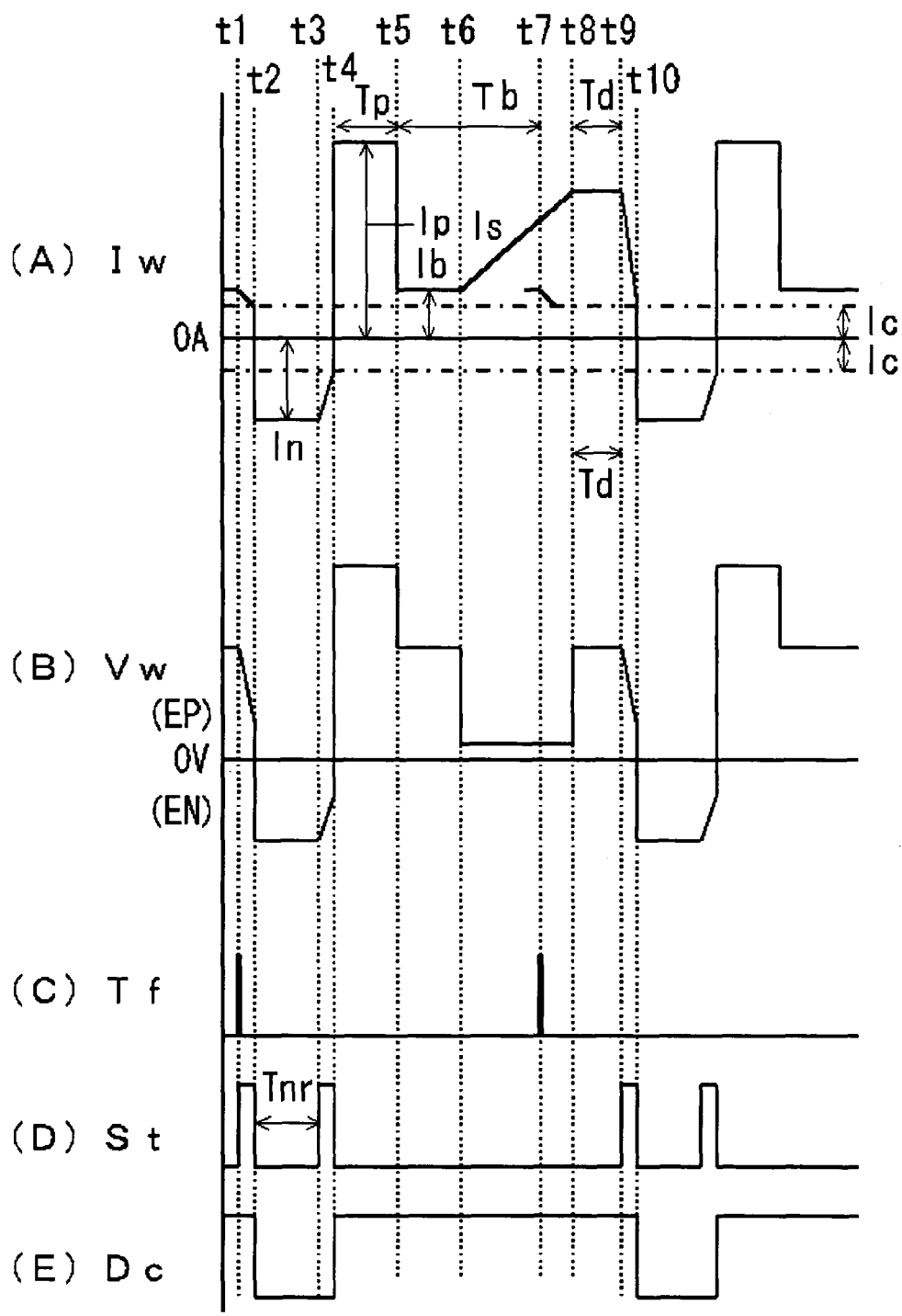
FIG. 1 is a timing chart which shows a polarity switching control method in consumable electrode AC pulse arc welding according to the present invention.

FIG. 1 shows a polarity switching control method in consumable electrode AC pulse arc welding according to the present invention. The figure is a timing chart which shows some of the signals in the above-described welding power source. Graph 1(A) shows the welding current Iw, Graph 1(B) shows the welding voltage Vw, Graph 1(C) shows the pulse period signal Tf, Graph 1(D) shows the operation-stop signal St, and Graph 1(E) shows the operation control signal Dc. FIG. 1 shows an instance where there is short-circuiting at the time of polarity switching.

(1) Period from Time Point t1 to Time Point t2.

As shown in Graph 1(C), the pulse period signal Tf assumes High level for a short period of time at Time Point t1, whereupon the operation-stop signal St assumes High level as shown in Graph 1(D), causing the welding power source to stop its output, and the welding current Iw decreases, as shown in Graph 1(A). At Time Point t2, the welding current Iw decreases to a polarity switching current value Ic, whereupon the electric-current comparison signal Cm in FIG. 2 changes to High level and the operation-stop signal St returns to Low level as shown in Graph 1(D), causing the welding power source to start its output. In response to this, the electric-current setting signal Ir in FIG. 2 assumes a value equal to the electrode-negative current In, and as shown in Graph 1(E), the operation control signal Dc changes to Low level, causing the transistors TR3 and TR4 to be turned on to switch to electrode-negative polarity EN.

(2) Period from Time Point t2 to Time Point t3

In this period, the operation control signal Dc stays at Low level as shown in Graph 1(E), and thus the electrode-negative current In is supplied as shown in Graph 1(A) and an electrode-negative voltage as shown in Graph 1(B) is applied.

(3) Period from Time Point t3 to Time Point t4.

Upon a lapse of a predetermined time, i.e. at Time Point t4, the operation-stop signal St assumes High level as shown in Graph 1(D), causing the welding power source to stop its output, and the welding current Iw decreases as shown in Graph 1(A). At Time Point t4, the welding current Iw decreases to the polarity switching current value Ic, whereupon the electric-current comparison signal Cm in FIG. 2 changes to High level, and the operation-stop signal St returns to Low level as shown in Graph 1(D), causing the welding power source to start its output. In response to this, the electric-current setting signal Ir in FIG. 2 assumes a value equal to the peak current Ip, and as shown in Graph 1(E), the operation control signal Dc changes to High level, causing the transistors TR1 and TR2 to be turned on to switch to the electrode-positive polarity EP.

(4) Period Time Point t4 to Time Point t5.

In this peak period Tp, the operation control signal Dc remains at High level as shown in Graph 1(E). Thus, a peak current Ip is supplied as shown in Graph 1(A) in electrode-positive polarity EP, and a peak voltage as shown in Graph 1(B) is applied.

(5) Period from Time Point t5 to Time Point t6.

In this period included in the base period Tb, a base current Ib is supplied as shown in Graph 1(A), and a base voltage as shown in Graph 1(B) is applied.

(6) Period from Time Point t6 to Time Point t7.

When short-circuiting occurs at Time Point t6, the welding voltage Vw assumes a low short-circuit voltage value as shown in Graph 1(B) whereas as shown in Graph 1(A), the welding current Iw assumes a short-circuit current Is and increases.

(7) Period from Time Point t7 to Time Point t8.

At Time Point t7, the pulse period signal Tf changes to High level as shown in Graph 1(C) for a short period of time. However, the polarity switching operation is not performed because there is short-circuiting. As shown in Graph 1(D), the operation-stop signal St remains unchanged. Thus, the short-circuit current Is continues to be supplied as shown in Graph 1(A).

(8) Period from Time Point t8 to Time Point t9.

At Time Point t8, the arc resumes due to the application of the short-circuit current Is. In a predetermined delay period starting from Time Point t8 to Time point t9, the current value at the time of arc recurrence is maintained. Alternatively, during this period, the current value may be brought back to the base current value Ib. The delay period Td is provided for the purpose of preventing short-circuiting from recurring immediately after the generation of the arc. The duration of delay period Td is selected appropriately within a range from zero through a few milliseconds. There may be a case where no delay period is necessary.

(9) Period from Time Point t9 to Time Point t10.

When the delay period Td expires at Time Point t9, the operation-stop signal St assumes High level as shown in Graph 1(D), causing the welding power source to stop its output, and as shown in Graph 1(A), the welding current Iw decreases. At Time Point t10, the welding current Iw becomes as low as the polarity switching current value Ic whereupon the electric-current comparison signal Cm in FIG. 2 changes to High level, the operation-stop signal St returns to Low level as shown in Graph 1(D), causing the welding power source to start its output. In response to this, the electric-current setting signal Ir in FIG. 2 assumes a value equal to the electrode-negative current In, and as shown in Graph 1(E), the operation control signal Dc changes to Low level, causing the transistors TR3 and TR4 to be turned on to switch to the electrode-negative polarity EN.

The welding is performed by repeating the cycle of the above-described processes (1) through (9). According to the above-described embodiment, a polarity switching operation is performed after the arc resumes when short-circuiting is present at the time of polarity switching. This stabilizes the polarity switching, and serves to prevent prolonged short-circuiting and arc interruption.

Figure 3:
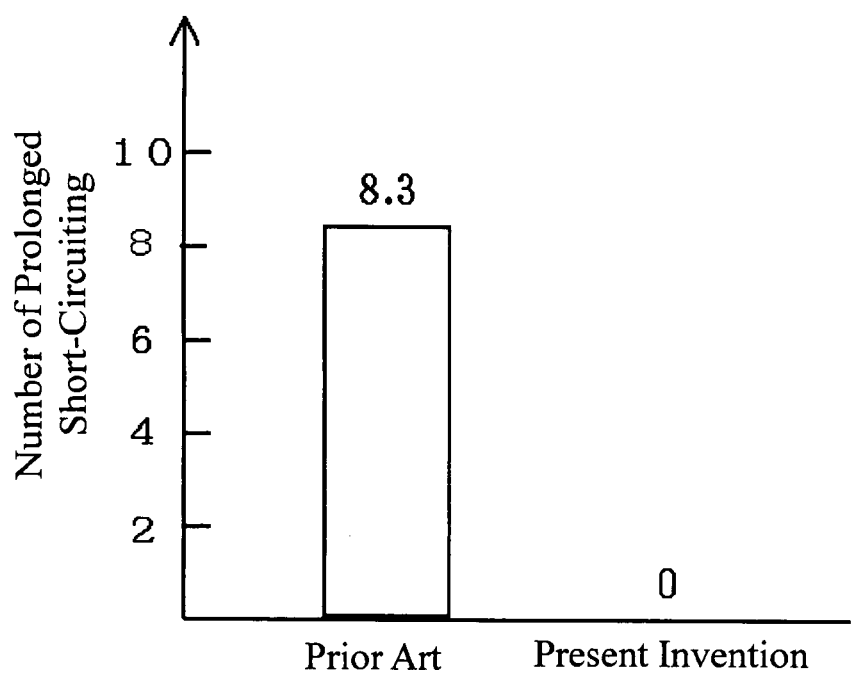
FIG. 3 shows the number of occurrences of prolonged short-circuiting as a comparison between the prior art and the present invention.
Figure 4:
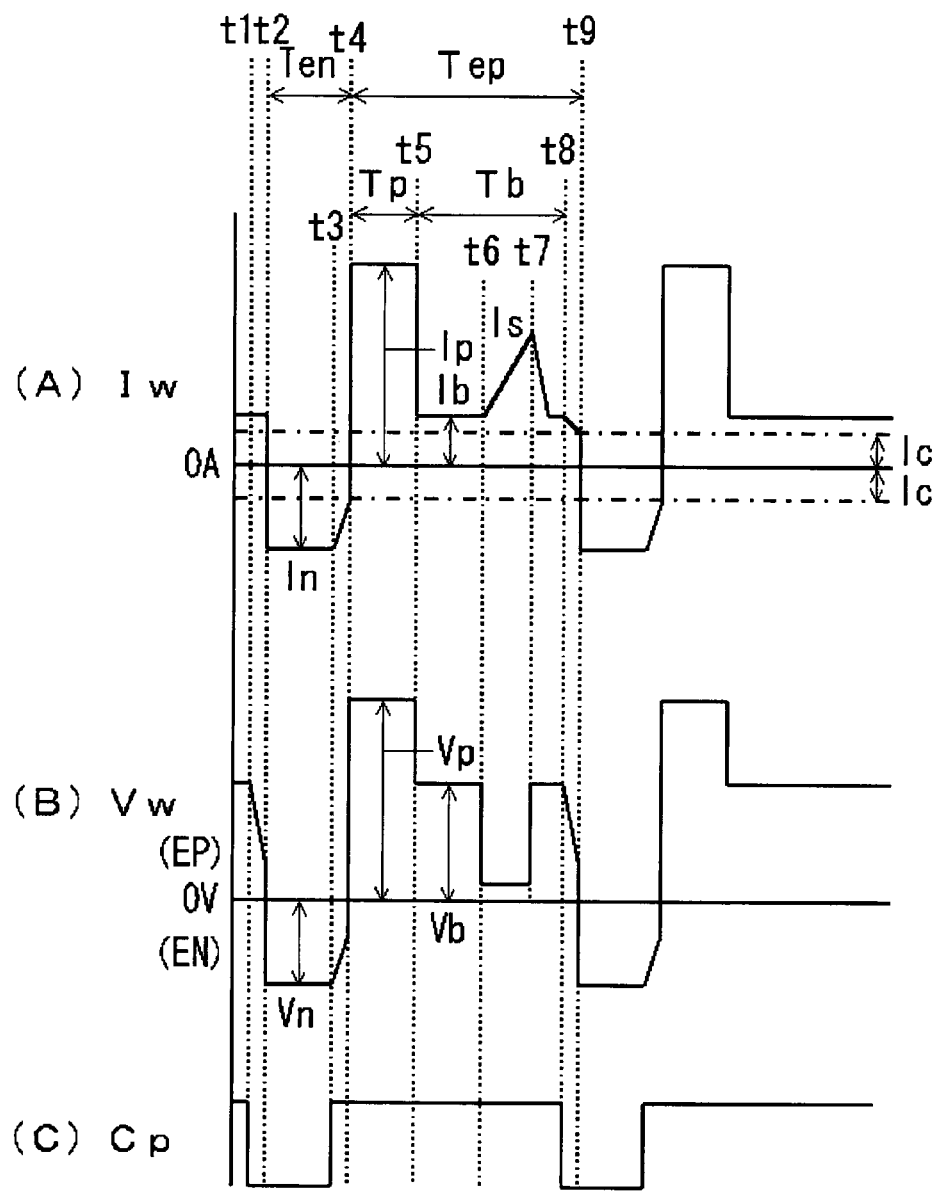
FIG. 4 is an electric-current/voltage waveform chart in a conventional AC pulse arc welding.
Figure 5:
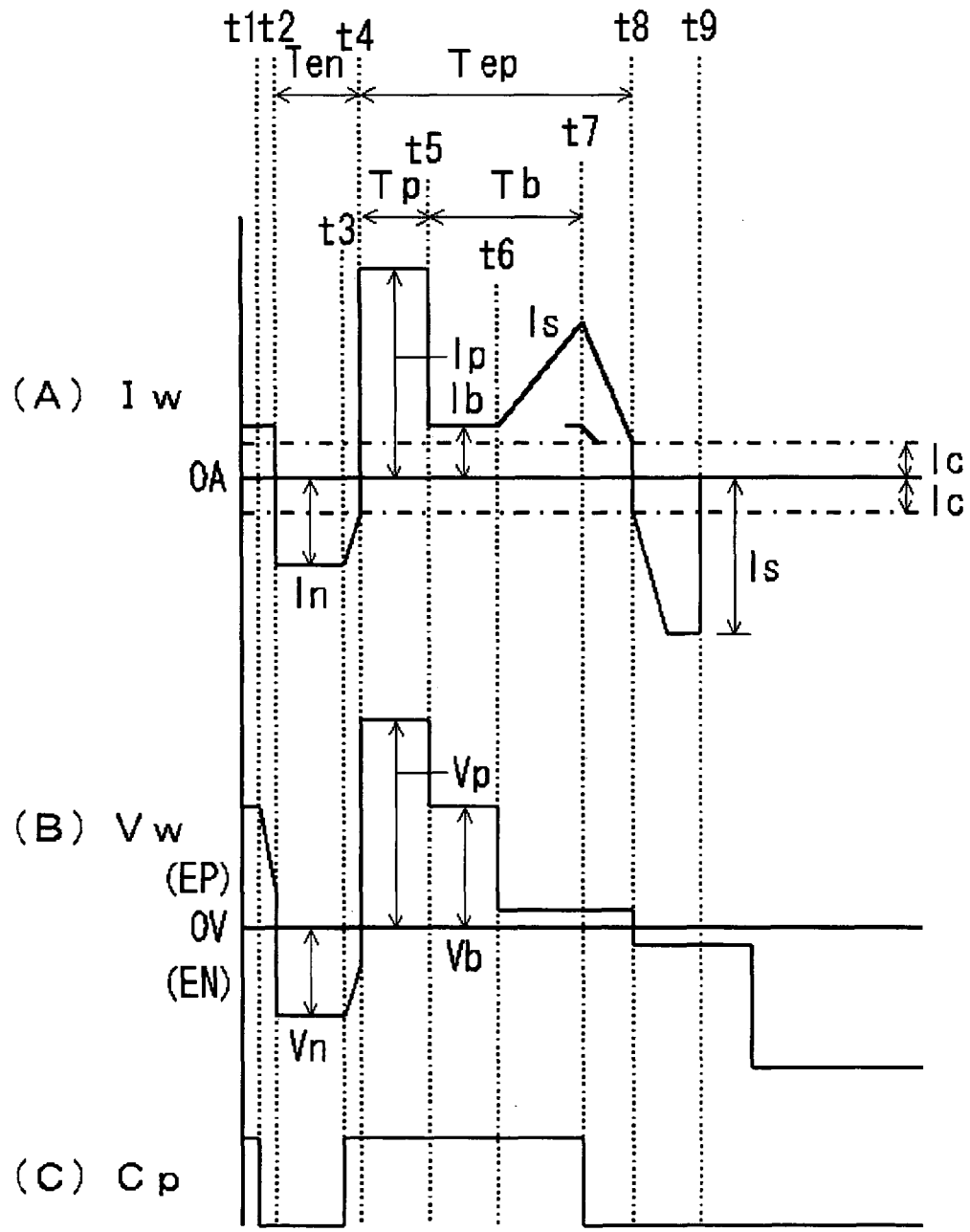
FIG. 5 is an electric-current/voltage waveform chart corresponding to FIG. 4.

FIG. 3 is a comparative figure illustrating the advantage of the present invention in terms of the number of occurrences of prolonged short-circuiting events. The comparative study was made in AC pulse MIG welding at 100 A and 15.5V, using an aluminum alloy wire having a diameter of 1.2 mm, and occurrences of a prolonged short-circuiting which lasted for a period not shorter than 10 ms were counted during a period of 30 seconds. It should be noted that in the comparative study, the welding voltage was set to a low value within an appropriate range, in order to create a favorable condition for the occurrence of short-circuiting.

As shown in the figure, 83 short-circuiting events resulted in prolonged short circuit when the conventional technique was used. On the contrary, the count was zero with the present invention. In both cases total numbers of the short-circuiting events were substantially the same, which indicates that the present invention prevents prolonged short-circuiting and promotes arc recurrence. Absence of prolonged short-circuiting means no arc interruption and hence improved arc stability.

The invention claimed is:

1. A polarity switching control method in consumable electrode AC pulse arc welding under power supply from a welding power source, the method comprising:
    applying a peak current and a base current during an electrode-positive polarity period;
    applying an electrode-negative current during an electrode-negative polarity period; and
    conducting polarity switching between the electrode-positive polarity period and the electrode-negative polarity period in response to a temporary operation-stop signal for temporarily stopping the power supply from the welding power source, the temporary operation-stop signal being output following output of a pulse period signal that causes an average of variable welding voltage to be equal to a voltage setting;
    conducting the polarity switching from positive to negative after a predetermined delay period has lapsed in response to the temporary operation-stop signal that is also delayed from the pulse period signal by at least said predetermined delay period, when a single consumable electrode and a base metal come in short circuit with each other during the electrode-positive polarity period, said predetermined delay period being provided for the single consumable electrode; and
    conducting the polarity switching from positive to negative in response to the temporary power-stop signal that is not delayed from the pulse period signal, when the consumable electrode and the base metal do not come in short circuit with each other during the electrode-positive polarity period.

2. The method according to claim 1, wherein a welding current applied at the generation of the arc is maintained during the delay period.

* * * * *